United States Patent [19]

Czech

[11] Patent Number: 5,039,738

[45] Date of Patent: Aug. 13, 1991

[54] EMULSIONS CONTAINING MODIFIED AMINOORGANOSILOXANE IMPART REDUCED YELLOWING WHEN USED AS FABRIC SOFTENERS

[75] Inventor: Anna M. Czech, Peekskill, N.Y.

[73] Assignee: Union Carbide Chemicals and Plastics Technology Corporation, Danbury, Conn.

[21] Appl. No.: 627,586

[22] Filed: Dec. 14, 1990

[51] Int. Cl.$^5$ .............................................. C08L 83/08
[52] U.S. Cl. ..................... 524/838; 524/588; 524/860; 524/869
[58] Field of Search ............... 524/588, 838, 860, 869; 528/26; 427/387, 389.9, 421, 430.1, 428

[56] References Cited

U.S. PATENT DOCUMENTS

| | | | |
|---|---|---|---|
| 2,928,858 | 3/1960 | Morehouse | 260/448.8 |
| 2,929,829 | 3/1960 | Morehouse | 260/448.2 |
| 3,209,053 | 9/1965 | Gilkey et al. | 260/824 |
| 3,702,860 | 11/1972 | Krahnke | 260/448.8 R |
| 3,772,351 | 11/1973 | Krahuke | 260/448.2 N |
| 3,984,386 | 10/1976 | Strain | 526/181 |
| 4,459,382 | 7/1984 | Ona et al. | 524/860 |
| 4,507,455 | 3/1985 | Tangney et al. | 528/26 |
| 4,705,704 | 11/1987 | Lane et al. | 524/588 |
| 4,956,240 | 9/1990 | Williams et al. | 427/387 |

OTHER PUBLICATIONS

Japanese Kokai 59,179,854, (*Chemical Abstracts*, vol. 102, 63555 (1985)) Fedoresak, I., Natarajan, A. T., Ehrenberg, L., Eur. J. Biochem., 10 450, 1969.
Burch, T. P., Ticku, M. K., Proc. Natl. Acad. Sci. USA, 78 (6) 3945, Methods Der Organische Chemie, Houben-Weyl, vol. 8.
Japanest Kokai 02,047,371, *Chemical Abstracts*, vol. 113 (2) 846 ly.

*Primary Examiner*—Paul R. Michl
*Assistant Examiner*—Peter Szekely
*Attorney, Agent, or Firm*—Bonnie L. Deppenbrock

[57] ABSTRACT

Process for preparing a modified aminoorganosiloxane emulsion having improved non-yellowing properties comprising reacting (a) a dialkyl pyrocarbonate, (b) a dialkyl oxalate, or (c) a mixture thereof with an aminoorganosiloxane in an aqueous emulsion in which (a), (b) or (c) ranges from about 0.1% to 15% based on the weight of aminoorganosiloxane in the emulsion.

20 Claims, No Drawings

EMULSIONS CONTAINING MODIFIED AMINOORGANOSILOXANE IMPART REDUCED YELLOWING WHEN USED AS FABRIC SOFTENERS

BACKGROUND OF THE INVENTION

1. FIELD OF THE INVENTION

The present invention relates to an aqueous emulsion containing an aminoorganosiloxane modified by reaction with (a) a dialkyl pyrocarbonate, (b) dialkyl oxalate or (c) a mixture thereof, which emulsions impart reduced yellowing of textile fabrics and/or fibers when used as fabric softeners.

2. THE PRIOR ART

Fabrics have been treated for many years to improve their properties and acceptability to consumers. Improved softness (hand), reduction in static and greater ease in ironing are some of the desired properties. Some treatments used to achieve these results, however, are counter-productive. For example, application of durable press resins to improve ease of ironing is known to give fabrics a harsher hand. Also, some treatments to improve softness result in yellowing of the fabric.

It is well known to apply various types of textile conditioners to make textiles softer. By way of illustration, aminoorganosiloxanes and their aqueous emulsions have been widely used to impart superior softness and smoothness to natural and synthetic fibers and fabrics. However, in some applications, these aminoorganosiloxanes have a tendency to yellow fabrics and fibers. It is thought that the aminofunctionality is susceptible to oxidation and that this chemical reactivity may result in a variety of undesired chemical reactions which ultimately cause yellowing in some fabrics and fibers.

Some attempts have been made to modify aminoorganosiloxane. Several examples of modified aminoorganosiloxanes with reduced reactivity are known in the prior art. U.S. Pat. Nos. 2,929,829 and 2,928,858 disclose that organosiloxane containing acylamino groups can be prepared by the reaction of the corresponding aminosiloxane with carboxylic acids, esters, halides or anhydrides. Similar amide-modified organosiloxanes have been disclosed in U.S. Pat. No. 4,507,455.

Urea has been reacted with an organopolysiloxane having pendant diamine groups to provide organopolysiloxanes with ureido-substitution (U.S. Pat. Nos. 3,209,053; 3,702,860; and 3,772,351).

Japanese Kakai No. 59,179,854 (Chemical Abstracts, Vol 102, 63555 (1985)) relates to the reaction of polysiloxanes containing aminoalkyl groups with epoxy compounds, for example, glycidol. The products of this reaction are resistant to heat and oxidation and useful as softening agents for treating textiles.

Diethyl pyrocarbonate has been demonstrated to be a useful reagent to derivatize water soluble enzymes (Fedoresak I, Natarajan, A. T., Ehrenberg, L., Eur. J. Biochem., 10 450, 1969) and aminoacids (Burch, T. P., Ticku, M. K., Proc. Natl. Acad. Sci. U.S.A., 78 (6), 3945) in situ in aqueous solutions at ambient temperature. The reaction of diethyl oxalate with ammonia or an amine to produce an amide is known (Methods Der Organische Chemie, Houben-Weyl, Volume 8). However, there appears to be no prior art disclosing the use of such pyrocarbonates or oxalates with aminoorganosiloxane emulsions, particularly those for fabrics and fibers.

OBJECTIVES OF THE INVENTION

It is an object of the present invention to prepare a modified aminoorganosiloxane emulsion that when applied to fibers and fabrics exhibits improved non-yellowing properties while maintaining good softening properties.

Other objects and advantages of the present invention will be made apparent by the description and examples that follow.

SUMMARY OF THE INVENTION

The present invention provides a process for preparing a modified aminoorganosiloxane. The modified aminoorganosiloxane prepared from said process, when used in an emulsion, imparts improved non-yellowing properties to the treated fabric or fiber while retaining softness. The modified aminoorganosiloxane emulsion which can impart such properties is prepared by reacting a dialkyl component selected from the group consisting of (a) a dialkyl pyrocarbonate, (b) a dialkyl oxalate and (c) a mixture of the (a) and (b) with an aminoorganosiloxane in an aqueous emulsion.

DETAILED DESCRIPTION OF THE INVENTION

In accordance with the present invention a modified aminoorganosiloxane emulsion is prepared by reacting (a) a dialkyl pyrocarbonate, (b) a dialkyl oxalate or (c) a mixture of (a) and (b) with an aminoorganosiloxane in an aqueous emulsion to form a corresponding carbamate and/or amide.

Aminoorganosiloxanes that can be used in the practice of the process of the present invention have the general formula:

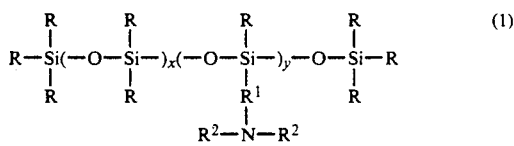

In the formula (1) above, R is the same or different and is a monovalent hydrocarbon selected from the group consisting of (i) an alkyl group having 1 to 4 carbon atoms, preferably 1 to 2 carbon atoms, (ii) an aryl group having 6 to 7 carbon atoms such as phenyl or tolyl; and (iii) an arylalkyl group having 7 to 10 carbon atoms such as benzyl. $R^1$ is selected from the group consisting of (i) an alkylene group having 1 to 20 carbon atoms, preferably 1 to 10 carbon atoms, most preferably 1 to 5 carbon atoms; (ii) an arylene having 6 to 14 carbon atoms, preferably 6 to 10 carbon atoms; (iii) an alkoxyalkyl having 4 to 16 carbon atoms, preferably 6 to 10 carbon atoms; and (iv) an aryloxyalkyl having 7 to 16 carbon atoms, preferably 8 to 10 carbon atoms. An especially preferably $R^1$ is an alkylene group with 3 carbon atoms.

In the formula (1) above, $R^2$ is selected from the group consisting of hydrogen, one of the groups defined above as R, or an aminoorgano group of the general formula $-R^3N(R^4)R^5$. It is essential that at least one $R^2$, $R^3$, $R^4$ or $R^5$ be a hydrogen atom. Tertiary amino groups are not reactive and, hence, do not work in the present invention. When $R^2$ is an aminoorgano of the formula $-R^3N(R^4)R^5$, $R^3$ is selected from the group consisting from (i) an alkylene group having 1 to 20 carbon atoms, preferably 1 to 10 carbon atoms, most preferably 1 to 5 carbon atoms, (ii) an arylene having 6 to 14 carbon atoms, preferably 6 to 10 carbon atoms, (iii) an alkoxyalkyl having 4 to 16 carbon atoms, preferably 6 to 10 carbon atoms, and (iv) an aryloxyalkyl having 7 to 16 carbon atoms, preferably 8 to 10. $R^4$ and $R^5$ can be the same or different and are a monovalent hydrocarbon selected from the group consisting of (i) an alkyl group having 1 to 4 carbon atoms, preferably 1 to 2 carbon atoms, (ii) an aryl group having 6 to 7 carbon atoms, such as phenyl or tolyl, and (iii) an arylalkyl group having 7 carbon atoms such as benzyl.

In the formula (1) above, x is an integer equal to or greater than 0. Preferably, the integer x ranges from 0 to 500, most preferably from 0 to 300. In the formula y is an integer equal to or greater than 1. Preferably, the integer y ranges from about 1 to 20, most preferably from 1 to 10. The acceptable viscosity range for the aminofunctional polysiloxane is from 10 to 10,000 centipoise at 25° C.

The preparation of aminoorganosiloxanes and their aqueous emulsions are known to those skilled in the art. For example, the preparation of aminoorganosiloxanes is disclosed in U.S. Pat. Nos. 3,033,815; 3,146,250; 3,355,424 and 2,891,920. To prepare an aqueous emulsion, an aminoorganosiloxane is optionally combined with emulsifiers known in the art and diluted to a desired polymer level with water. Such emulsions are commercially available from Union Carbide Chemicals And Plastics Company Inc.

In the practice of the present invention a dialkyl component selected from the group consisting of (a) a dialkyl pyrocarbonate, (b) dialkyl oxalate and (c) a mixture of (a) and (b) is reacted with an aminoorganosiloxane, or preferably, the dialkyl component (a), (b) or (c) is reacted, with an aqueous emulsion of the aminoorganosiloxane. In the practice of the process of the present invention, dialkyl component (a), (b) or (c) can be reacted with the aminoorganosiloxane and the modified aminoorganosiloxane made into an emulsion. However, this practice is not preferred because it is not known whether or not the emulsion so prepared remains stable for long periods of time, such as for more than several months. Additionally, reacting component (a), (b) or (c) with an aminoorganosiloxane in an aqueous emulsion is generally easier and more convenient.

Dialkyl pyrocarbonates and dialkyl oxalates are commercially available, for example, from Aldrich Chemical Company, Inc., located in Milwaukee, Wisconsin. Dialkyl pyrocarbonates suitable for use in the process of the present invention are selected from dimethyl pyrocarbonate, diethyl pyrocarbonate, dipropyl pyrocarbonate, dibutyl pyrocarbonate and dipentyl pyrocarbonate and mixtures thereof. Dimethyl- and diethyl pyrocarbonate are preferred. Suitable dialkyl oxalates that can be employed in the process of the present invention include dimethyl oxalate, diethyl oxalate, dipropyl oxalate, dibutyl oxalate, and dipentyl oxalate and mixtures thereof. Dimethyl-and diethyl oxalate are preferred. In the practice of the process of the present invention, other esters such as ethylene carbonate, propylene carbonate and diethyl carbonate do not work.

In general aminoorganosiloxane emulsions modified with a dialkyl pyrocarbonate exhibit slightly better whiteness, i.e., exhibit less of a tendency to yellow than an emulsion modified with a dialkyl oxalate. However, dialkyl pyrocarobonates are generally more expensive than dialkyl oxalates.

In the process of the present invention the amount of said dialkyl components selected from the group consisting of a (a) dialkyl pyrocarbonate, (b) dialkyl oxalate and (c) a mixture of a (a) and (b), respectively, ranges from 0.1% to 15%, preferably 1% to 10% and most preferably 2% to 5% of the weight of aminoorganosiloxane in the emulsion.

The process of the present invention involves a direct, slow addition of a (a) dialkyl pyrocarbonate, (b) dialkyl oxalate or a (c) mixture of (a) and (b) with stirring into an aqueous emulsion of an aminoorganosiloxane. This reaction takes place at ambient temperature and pressure. After (a), (b) or (c) is added to the emulsion it is stirred for about one hour. When a dialkyl pyrocarbonate is reacted with the aminoorganosiloxane in the emulsion, carbon dioxide is produced as a by-product. However, the reaction of aminoorganosiloxane with a dialkyl oxalate does not result in carbon dioxide production due to the structural differences of the dialkyl oxalate as compared to a dialkyl pyrocarbonate.

Modified aminoorganosiloxane emulsions of the present invention can be diluted with water to a desired polymer level and applied onto a fiber or a fabric substrate, such as by spraying, dipping or kiss roll application. Indeed, it will be more common to prepare an emulsion at a higher polymer content in order to reduce shipping and/or handling costs and then dilute the emulsion with water immediately prior to use. The polymer content of the modified aminoorganosiloxane emulsions of the process of the present invention range from about 1 to 80 percent, preferably about 10 to 60 percent, most preferably about 20 to 50 percent based on the total weight of the emulsion.

After the fiber or fabric substrate is dried either at room temperature or by heat, it is then cured at a temperature less than the melting or decomposition temperature of the substrate. Heating can be done by any suitable method, but preferably is done by passing the substrate through a hot air oven. The resulting treated substrate thus has properties such as softness and whiteness.

The fibrous substrate which can be treated with the emulsion of the present invention is exemplified by natural fibers such as cotton, flax, silk and wool; synthetic fibers such as polyester, polyamide, polyacrylonitrile, polyethylene, polypropylene and polyurethane; and inorganic fibers such as glass fibers and carbon fiber. The fabric substrate which can be treated with the emulsion of the present invention is exemplified by the fabrics produced from the above-mentioned fibrous materials or blends thereof.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

EXAMPLES

In the examples the fabrics and test procedures used were as follows:

Fabric Identification (Test Fabrics Inc., Middlesex. NJ)

* Dacron 54W/Cotton, 65/35 Bleached Broadcloth, Style 7409
* Bleached Desized Mercerized Cotton Print Cloth, Style 400M
* Bleached Cotton Interlock Knit, Style 460

Test Procedures

* Conditioning Textiles for Testing, ASTM Method D-1776-79
* Reflectance, Blue and Whiteness of Bleached Fabric, AATCC Method 110-1979
* Softness evaluation was done by the hand panel and the tested fabrics were rated using 1 to 10 scale (while 1 was the softest and 10 was the harshest).

EXAMPLE 1

100 g of commercially available 40% emulsion (Emulsion I) of an aminoorganosiloxane having the following formula:

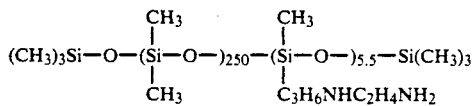

was stirred at room temperature and diethyl pyrocarbonate obtained from Aldrich Chemical Company, Inc. was added dropwise. The reaction was exothermic and the evolution of $CO_2$ occurred immediately. After the addition was completed, the stirring at room temperature was continued for one more hour. Three different levels of diethyl pyrocarbonate, which corresponded to 1%, 2% and 4% of the weight of the aminoorganosiloxane in the emulsion amount, were used. Resulting emulsions were designated as Emulsion A, B and C, respectively.

EXAMPLE 2

Following the procedure of Example 1, a second emulsion (Emulsion II) of a commercially available aminoorganosiloxane having the formula:

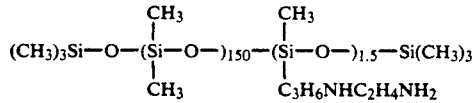

was modified with 2% (based on the weight of aminoorganosiloxane) of diethyl pyrocarbonate to form Emulsion D in accordance with the procedure set forth in Example 1.

EXAMPLE 3

Emulsions I and II (controls, that is, unmodified emulsions without a dialkyl pyrocarbonate), and Emulsions A, B, C and D as defined in Examples 1 and 2 were applied on 100% cotton and 65/35 polyester-cotton blend from the pad bath. A durable press resin ("DMDHEU:" dimethylol dihydroxy ethylene urea which is commercially available) and curing catalyst ($MgCl_2$) were used in all treatments to simulate typical textile finishing procedure. The polymer concentration in the treating composition (containing the modified aminoorganosiloxane, durable press resin, curing catalyst and water) was 1%.

Wet pick up was adjusted at 80% for the blend and 100% for the cotton; curing conditions were 171° C. for 1.5 minutes. To evaluate yellowing properties of the finish, treated fabrics were scorched in the oven at 200° C. for 100 sec and the whiteness was determined using a Spectrocolorimeter from HunberLab. Softness and reflectance data are summarized in Table 1.

TABLE 1

|  | 100% Cotton | | 65/35 Blend | |
| --- | --- | --- | --- | --- |
|  | Whiteness[a] | Softness[b]* | Whiteness[a] | Softness[b]* |
| Emulsion I | 40.7 | 2.5 | 55.6 | 2.0 |
| Emulsion A | 42.9 | 3.2 | 58.1 | 3.0 |
| Emulsion B | 46.9 | 3.2 | 63.1 | 2.5 |
| Emulsion C | 49.2 | 3.0 | 64.2 | 3.5 |
| Emulsion II | 54.8 | 2.7 | 62.2 | 4.0 |
| Emulsion D | 60.3 | 5.0 | 65.4 | 5.5 |

[a]Higher values correspond to whiter fabrics
[b]Lower values correspond to softer fabrics
*Experimental error is ± 0.5

From Table 1 it can be seen that the addition of a dialkyl pyrocarbonate to an aqueous emulsion of an aminoorgano polysiloxane resulted in improved whiteness.

EXAMPLE 4

The textile treatment was repeated as in Example 3, but no durable press resin was added to the treating composition. The whiteness data are given in Table 2.

TABLE 2

|  | WHITENESS | |
| --- | --- | --- |
|  | 100% Cotton | 65/35 Blend |
| Emulsion I | 45.2 | 66.6 |
| Emulsion A | 47.4 | 72.0 |
| Emulsion B | 50.3 | 72.5 |
| Emulsion C | 58.5 | 77.8 |
| Emulsion II | 55.8 | 61.2 |
| Emulsion D | 63.0 | 64.9 |

EXAMPLE 5

Following the procedure of Examples 1 and 2, 100 g of commercially available emulsions (I and II) were stirred at room temperature and diethyl oxalate was added dropwise. After the addition was completed, stirring at room temperature was continued for one hour.

Two different levels of diethyl oxalate (which correspond to 2% and 4% of the weight of aminoorganosiloxane in the emulsion) were added to Emulsion I to form stable modified emulsions designated as Emulsions E and F, respectively. Likewise, two different levels of diethyl oxalate (which correspond to 1% and 2% of the weight of aminoorganosiloxane in the emulsion) were added to Emulsion II to form stable modified emulsions designated as Emulsions G and H, respectively.

EXAMPLE 6

Emulsions I (control, i.e., having no dialkyl oxalate), E, F, II (control, i.e., having no dialkyl oxalate), G and H were applied on 100% cotton and 65/35 polyester-cotton blend fabrics from the pad bath using the same textile treatment procedure as described in Example 3. Reflectance and softness data are summarized in Table 3.

TABLE 3

| | 100% Cotton | | | | 65/35 Blend | |
|---|---|---|---|---|---|---|
| | woven | | knit | | woven | |
| | White-ness | Soft-ness | White-ness | Soft-ness | White-ness | Soft-ness |
| Emulsion I | 42.0 | 2.0 | 50.0 | 2.0 | 51.2 | 2.0 |
| Emulsion E | 48.4 | 3.2 | 54.3 | 3.3 | 56.8 | 3.5 |
| Emulsion F | 50.6 | 3.5 | 60.4 | 3.3 | 58.7 | 3.5 |
| Emulsion II | 54.8 | 2.5 | 61.6 | 4.7 | 62.2 | 3.8 |
| Emulsion G | 57.9 | 4.3 | 62.9 | 4.3 | 64.2 | 4.0 |
| Emulsion H | 58.4 | 5.5 | 63.6 | 5.6 | 65.1 | 4.7 |

EXAMPLE 7

Textile treatments were repeated as in Example 3, with the exception that no durable press resin was added to the treating composition. Reflectance data are in Table 4.

TABLE 4

| | WHITENESS | | |
|---|---|---|---|
| | 100% Cotton | | 65/35 Blend |
| | woven | knit | woven |
| Emulsion I | 51.0 | 43.8 | 60.3 |
| Emulsion E | 53.6 | 45.1 | 62.7 |
| Emulsion F | 58.4 | 53.3 | 63.9 |
| Emulsion II | 51.8 | 66.3 | 62.2 |
| Emulsion G | 57.9 | 68.3 | 64.2 |
| Emulsion H | 58.5 | 73.9 | 65.1 |

What is claimed is:

1. A process for preparing a modified aminoorganosiloxane emulsion having improved non-yellowing properties comprising reacting a dialkyl component selected from the group consisting of (a) a dialkyl pyrocarbonate, (b) a dialkyl oxalate, and (c) a mixture of (a) and (b) with an aminoorganosiloxane in an aqueous emulsion wherein the amount of said component ranges from about 0.1% to 15% based on the weight of aminoorganosiloxane in the emulsion.

2. A process according to claim 1 wherein the aminoorganosiloxane has the formula

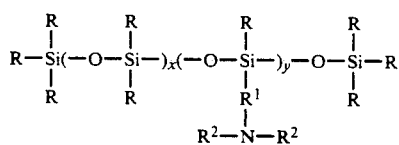

wherein R is the same or different and is a monovalent hydrocarbon selected from the group consisting of (i) an alkyl group having 1 to 4 carbon atoms, (ii) an aryl group having 6 to 7 carbon atoms, and (iii) an arylalkyl group having 7 to 10 carbon atoms; $R^1$ is selected from the group consisting of (i) an alkylene having 1 to 20 carbon atoms, (ii) an arylene having 6 to 14 carbon atoms, (iii) an alkoxyalkyl having 4 to 16 carbon atoms, and (iv) an aryloxyalkyl having 7 to 16 carbon atoms; $R^2$ is selected from the group consisting of (i) hydrogen, (ii) R as defined above, and (iii) an aminoorgano group of the formula $$-R^3N(R^4)R^5$$

wherein $R^3$ is selected from the group consisting of (i) an alkylene group having 1 to 20 carbon atoms, (ii) an arylene having 6 to 14 carbon atoms, (iii) an alkoxyalkyl having 4 to 16 carbon atoms, and (iv) an aryloxyalkyl having 7 to 16 carbon atoms; $R^4$ and $R^5$ are the same or different and each are a monovalent hydrocarbon selected from the group consisting of (i) an alkyl group having 1 to 4 carbon atoms, (ii) an aryl group having 6 to 7 carbon atoms, and (iii) an arylalkyl group having 7 carbon atoms; and wherein at least one $R^2$, $R^3$, $R^4$ or $R^5$ is a hydrogen atom; x is an integer equal to or greater than 0; y is an integer from 1 to 20; and the viscosity of the aminoorganosiloxane is from about 10 to about 10,000 centipoise at 25° C.

3. A process according to claim 2 wherein R is an alkyl group having 1 to 3 carbon atoms; $R^1$ is an alkylene group having from 1 to 5 carbon atoms; and x is 0 to 500.

4. A process according to claim 3 wherein R is an alkyl group having 1 to 2 carbon atoms; $R^1$ is an alkylene group having from 1 to 3 carbon atoms; x is 0 to 300 and y is 1 to 10.

5. A process according to claim 2 wherein the dialkyl pyrocarbonate is selected from the group consisting of dimethyl pyrocarbonate, diethyl pyrocarbonate, dipropyl pyrocarbonate, dibutyl pyrocarbonate, and dipentyl pyrocarbonate.

6. A process according to claim 2 wherein the dialkyl oxalate is selected from the group consisting of dimethyl oxalate, diethyl oxalate, dipropyl oxalate, dibutyl oxalate, and dipentyl oxalate.

7. A process according to claim 4 wherein the dialkyl pyrocarbonate is dimethyl pyrocarbonate.

8. A process according to claim 4 wherein the dialkyl pyrocarbonate is diethyl pyrocarbonate.

9. A process according to claim 4 wherein the dialkyl oxalate is dimethyl oxalate.

10. A process according to claim 4 wherein the dialkyl oxalate is diethyl oxalate.

11. A process according to claim 2 wherein the amount of said dialkyl component ranges from about 1% to 10% based on the weight of aminosiloxane in the emulsion.

12. A process according to claim 2 wherein the amount of said dialkyl component ranges from about 2% to 15% based on the weight of aminoorganosiloxane in the emulsion.

13. A process according to claim 1 wherein the modified aminoorganosiloxane emulsion has a polymer content ranging from about 1 to 80 percent by weight.

14. A process according to claim 1 wherein the modified aminoorganosiloxane emulsion has a polymer content ranging from about 10 to 60 percent by weight.

15. A process according to claim 14 wherein the polymer content ranges from about 20 to 50 percent by weight.

16. A process according to claim 1 wherein the modified aminoorganosiloxane emulsion is applied to a fabric substrate by spraying, dipping or kiss roll application.

17. A process according to claim 16 wherein the fabric substrate is produced from fibrous material selected from natural fibers, synthetic fibers, and inorganic fibers, and blends thereof.

18. A process according to claim 17 wherein the natural fibers are selected from cotton, flax, silk and wool; the synthetic fibers are selected from polyester, polyamide, polyacrylonitrile, polyethylene, polypropylene and polyurethane; and the inorganic fibers are selected from glass fiber and carbon fiber.

19. A modified aminoorganosiloxane emulsion prepared according to claim 1.

20. A modified aminoorganosiloxane emulsion prepared according to claim 14.

* * * * *